United States Patent Office 3,787,356
Patented Jan. 22, 1974

3,787,356
FIRE RETARDANT COMPOSITIONS
Jerome A. Gourse, Chicago, Ill., assignors to Velsicol
Chemical Corporation, Chicago, Ill.
No Drawing. Filed May 8, 1972, Ser. No. 251,722
Int. Cl. C08f 45/62
U.S. Cl. 260—45.75 B        6 Claims

ABSTRACT OF THE DISCLOSURE

This invention discloses new fire retardant polymeric compositions which comprise a combustible polymer and the compound 1,2-dibromo-4,5,6,7,8,8-hexachloro-3a,4,7,7a-tetrahydro-4,7-methanoindane.

---

This invention relates to novel fire retardant compositions and more particularly relates to fire retardant polymeric compositions containing as an essential ingredient the halogenated compound of this invention.

It is known that the fire retardant properties of various polymeric materials may be enhanced by the addition of various halogenated organic compounds which are derived from polyhalogenated cyclopentadiene. It has now been found that when a particular compound containing both chlorine and bromine substituents is used it imparts exceptional fire retardant properties to combustible polymers when incorporated therein.

The compound of this invention which possesses these desirable fire retardant properties is 1,2-dibromo-4,5,6,7,8,8-hexachloro - 3a,4,7,7a - tetrahydro-4,7-methanoindane. Thus, one embodiment of the present invention resides in a fire retardant polymeric composition comprising a combustible polymer and the compound 1,2-dibromo-4,5,6,7,8,8-hexachloro-3a,4,7,7a-tetrahydro-4,7-methanoindane.

The halogenated compound of this invention in addition to exhibiting exceptional fire retardant properties is less toxic and more biodegradable than the closely related compounds.

The preparation of this compound is described in the following example.

EXAMPLE 1

Preparation of 1,2-dibromo-4,5,6,7,8,8-hexachloro-3a,4,7,7a-tetrahydro-4,7-methanoindane 4,5,6,7,8,8 - hexachloro-3a,4,7,7a-tetrahydro-4,7-methanoindane (170 grams; 0.5 mol), ferric chloride (1 gram) and carbon tetrachloride (500 ml.) were charged into a glass reaction flask equipped with a mechanical stirrer, thermometer, reflux condenser and addition funnel. The mixture was heated at reflux and a solution of bromine (80 grams; 0.5 mol) in carbon tetrachloride (100 ml.) was added dropwise over a period of about 1 hour. After the addition was completed stirring was continued for a period of about 1 hour. After this time the reaction mixture was treated with powdered activated carbon. The carbon was then removed by filtration and the filtrate was stripped of solvent on a rotary evaporator. The residue was recrystallized from isopropyl alcohol to yield the desired product 1,2-dibromo-4,5,6,7,8,8-hexachloro-3a,4,7,7a-tetrahydro-4,7-methanoindane having a melting point of 123 to 130° C. and having a decomposition point of 289° C.

The halogenated compound of this invention imparts fire retardant properties to combustible polymers by forming an intimate admixture therewith. This admixture can be readily prepared by one of several methods well known in the art. For example the halogenated compound can be admixed into the combustible polymer while the latter is dissolved in a suitable solvent. This procedure is especially useful when it is desired to mix the halogenated compound during the preparation of the polymer. The halogenated compound can also be mixed with the combustible polymer in the molten state at a temperature that can range from the melting point of the polymer to a temperature just below the decomposition temperature of the polymer. Another method of forming an intimate admixture comprises dry blending the halogenated compound with the polymer in the finely divided state. Subsequent molding or extrusion of this blend can then result in a substantially homogeneous composition.

The fire retardant polymeric compositions of the instant invention can contain from about 5 to about 50 weight percent of the halogenated compound of this invention. The exact amount of halogenated compound employed will depend upon such factors as the degree of fire retardancy desired, the specific combustible polymer used, the end use of the resulting product and the like.

The halogenated compound of this invention can impart fire retardant properties to combustible polymers. Exemplary of such polymers which can be used in admixture with the halogenated compounds to form the fire retardant polymeric compositions of this invention are the homopolymers and copolymers of unsaturated aliphatic, cycloaliphatic and aromatic hydrocarbons, such as polyethylene, polypropylene, polybutene, ethylene propylene copolymers, copolymers of ethylene or propylene with other olefins, polybutadiene, polymers of butadiene, polyisoprene, polystyrene, polyvinylidene, and polymers of pentene, hexene, heptene, octene, 2-methylpropene-1, 3-methylbutene-1, 4-methylpentene-1, 4-methylhexene-1, 5-methylhexene-1, bicyclohexene (2.2.1), pentadiene, hexadiene, 2,3 - dimethylbutadiene-1,3, 2 - methylpentadiene, vinylcyclohexene such as 4-vinylcyclohexene, cyclopentadiene, methylstyrene and the like. Other useful polymers include indene-coumarone resins, polymers of acrylate esters and polymers of methacrylate esters, acrylate and methacrylate resins such as ethyl acrylate, n-butyl methacrylate, isobutyl methacrylate, ethyl methacrylate, and methyl methacrylate, alkyd resins, hydrocarbon resins from petroleum, isobutylene resins, polyurethanes, polyester resins such as unsaturated polyesters of dibasic acids and dihydroxy compound, polyester elastomers, polyisobutylene, rubbers such as natural rubber, synthetic polyisoprene, chlorinated rubber, polybutadiene, cyclized rubber, butadiene-acrylonitrile rubber, butadiene-styrene rubber, butyl rubber, neoprene rubber, polystyrene, terpene resins, urea resins, vinyl resins such as poly(vinyl acetal), poly(vinyl acetate), vinyl alcohol-acetate copolymer, poly(vinyl alcohol), poly(vinyl alkyl ether), vinyl methyl ether-maleic anhydride copolymer, poly(vinyl chloride), poly(vinyl butyral), vinyl chloride-acetate copolymer, poly(vinyl pyrrolidone) vinylidene chloride copolymers and the like. Additional useful polymers include nylon, diallyl phthalates, and phthalate resins and polycarbonates.

The preferred fire retardant polymeric composition of the present invention comprises the compound 1,2-dibromo-4,5,6,7,8,8-hexachloro-3a,4,7,7a - tetrahydro - 4,7-methanoindane and a combustible polymer selected from the group consisting of polystyrene, polyethylene, polypropylene, and a terepolymer of acrylonitrile, butadiene and styrene.

One important use of fire retardant polymeric compositions is in the molding of fire retardant household appliances. In such applications the toxicity of the fire retarding additive must be taken into consideration since most highly halogenated compounds are exceedingly toxic. Surprisingly, the halogenated compound of the present invention has a very low order of toxicity when compared to structurally related compounds. This low toxicity makes the compound particularly suitable as a fire retarding additive for combustible polymers useful for moulding articles which come in contact with human life.

The fire retardant compositions of this invention can also contain adjuvants which in conjunction with the halogenated compound improve the fire retardancy of the composition and in some instances provide synergistic results not obtainable with the use of the compound alone. Such adjuvants can comprise antimony compounds such as antimony trioxide, zinc borate, lead arsenates such as $PbHAsO_4$ and the like. These adjuvants can comprise from about 1 to about 35% by weight of the total composition.

The effectiveness of the halogenated compound of this invention as a flame retardant was demonstrated in an experiment wherein fire retardant compositions comprising the halogenated compound and various combustible polymers were subjected to a flammability test using the oxygen index method. The flammability test was carried out in accordance with the general procedures detailed in the ASTM D 2863–70 test method. This method provides a procedure for determining the relative flammability of plastics by measuring the minimum concentration of oxygen expressed as volume percent, in a slowly rising mixture of oxygen and nitrogen that will just support combustion. The results of this experiment are set forth in the following examples. In each of these examples the components were blended in the molten state using a dough blender.

|  | Composition, parts by weight | Oxygen index, percent |
|---|---|---|
| Example 2: |  |  |
| Polyethylene | 60 | 35.5 |
| Product of Example 1 | 40 |  |
| Example 3: |  |  |
| Polyethylene | 65 | 32.0 |
| Product of Example 1 | 25 |  |
| Antimony trioxide | 7 |  |
| Zinc borate | 3 |  |
| Example 4: |  |  |
| ABS* | 60 | 40.0 |
| Product of Example 1 | 40 |  |
| Example 5: |  |  |
| Polystyrene | 60 | >40.0 |
| Product of Example 1 | 40 |  |

*Terepolymer of acrylonitrile, butadiene and styrene.

The above data demonstrates the flame retardant properties of the fire retardant compositions of this invention. It can be seen when the foregoing values are compared to the standard oxygen index of polyethylene and polystyrene which are 17.4 and 18.1% respectively (as published in the Flammability Handbook for Plastics; Carlos Hilado, 1969) that the halogenated compound of the present invention is very effective as a flame retardant for combustible polymers.

Additional physical properties of a fire retardant composition of this invention are shown in the following table:

Physical properties of fire retardant ABS

| Composition phr.: |  |  |  |
|---|---|---|---|
| ABS | 100 | 100 | 100 |
| Product of Example 1 |  | 20 | 20 |
| Antimony oxide |  |  | 5 |
| Oxygen index | 19.5 | 26.5 | 32.0 |
| Char | None | Fair | Fair |
| Tensile strength (D638–68)[1] p.s.i | 4,930 | 4,727 | 4,691 |
| Flexural strength (D790–70)[1] p.s.i | 6,807 | 6,536 | 6,302 |
| Modulus (D790–70)[1] p.s.i | 239,000 | 234,200 | 228,500 |
| Impact strength (D256–70)[1] ft.-lb./in. | 6.03 | 6.03 | 3.78 |
| Heat distortion temperature (D648–56)[1] °C | 79.0 | 73.4 | 72.4 |
| Shore "D" hardness (D2240)[1] | 79.6 | 79.0 | 77.5 |
| Water adsorption (D570–63)[1] percent gain | 0.24 | 0.19 | 0.185 |
| Thermal aging at 120° C. after 192 hrs., percent loss | .32 | .61 | .485 |
| Solvent extraction (D1239–55)[1] percent change: |  |  |  |
| Distilled water | +.185 | +.17 | +.15 |
| 1% soap solution | +.18 | +.18 | +.14 |
| Cottonseed oil | +.005 | +.035 | +.02 |
| Mineral oil | +.01 | +.05 | +.01 |
| Kerosine | .00 | .00 | −.01 |
| 50% ethyl alcohol | +.175 | +.165 | +.15 |

[1] ASTM test method.

I claim:
1. A fire retardant polymeric composition comprising a combustible polymer and from about 5 to about 50 weight percent of the total composition the compound 1,2-dibromo-4,5,6,7,8,8-hexachloro-3a,4,7,7a-tetrahydro-4,7-methanoindane.

2. A fire retardant polymeric composition comprising the combustible polymer polystyrene and from about 5 to about 50 weight percent of the total composition the compound 1,2-dibromo-4.5,6,7,8,8-hexachloro-3a,4,7,7a-tetrahydro-4,7-methanoindane.

3. A fire retardant polymeric composition comprising the combustible polymer polyethylene and from about 5 to about 50 weight percent of the total composition the compound 1,2-dibromo-4.5,6,7,8,8-hexachloro-3a,4,7,7a-tetrahydro-4,7-methanoindane.

4. A fire retardant polymeric composition comprising the combustible polymer a terpolymer of acrylonitrile, butadiene and styrene and from about 5 to about 50 weight percent of the total composition the compound 1,2-dibromo-4,5,6,7,8,8-hexachloro-3a,4,7,7a-tetrahydro-4,7-methanoindane.

5. The composition of claim 1 which contains from about 1 to about 35% by weight of an adjuvant selected from the group consisting of antimony trioxide, zinc borate and lead arsenate.

6. A fire retardant polymeric composition comprising the combustible polymer polyester and from about 5 to about 50 weight percent of the total composition the compound 1,2 - dibromo-4,5,6,7,8,8-hexachloro-3a,4,7,7a-tetrahydro-4,7-methanoindane.

References Cited
UNITED STATES PATENTS

| 3,418,263 | 12/1968 | Hindersinn | 260—45.7 R |
| 2,750,397 | 6/1956 | Goldman | 260—648 C |
| 3,154,579 | 10/1964 | Flanagan | 260—648 C |
| 3,403,036 | 9/1968 | Hindersinn | 260—45.75 B |

FOREIGN PATENTS

| 794,661 | 5/1958 | Great Britain | 260—648 C |

PHILIP E. ANDERSON, Primary Examiner

W. E. PARKER, Assistant Examiner

U.S. Cl. X.R.

260—45.7 R, 648 C, 814, Dig. 24

Notice of Adverse Decision in Interference

In Interference No. 98,782, involving Patent No. 3,787,356, J. A. Gourse, FIRE RETARDANT COMPOSITIONS, final judgment adverse to the patentee was rendered July 20, 1977, as to claims 1–6.

[*Official Gazette December 20, 1977.*]